United States Patent Office 2,722,296
Patented Nov. 1, 1955

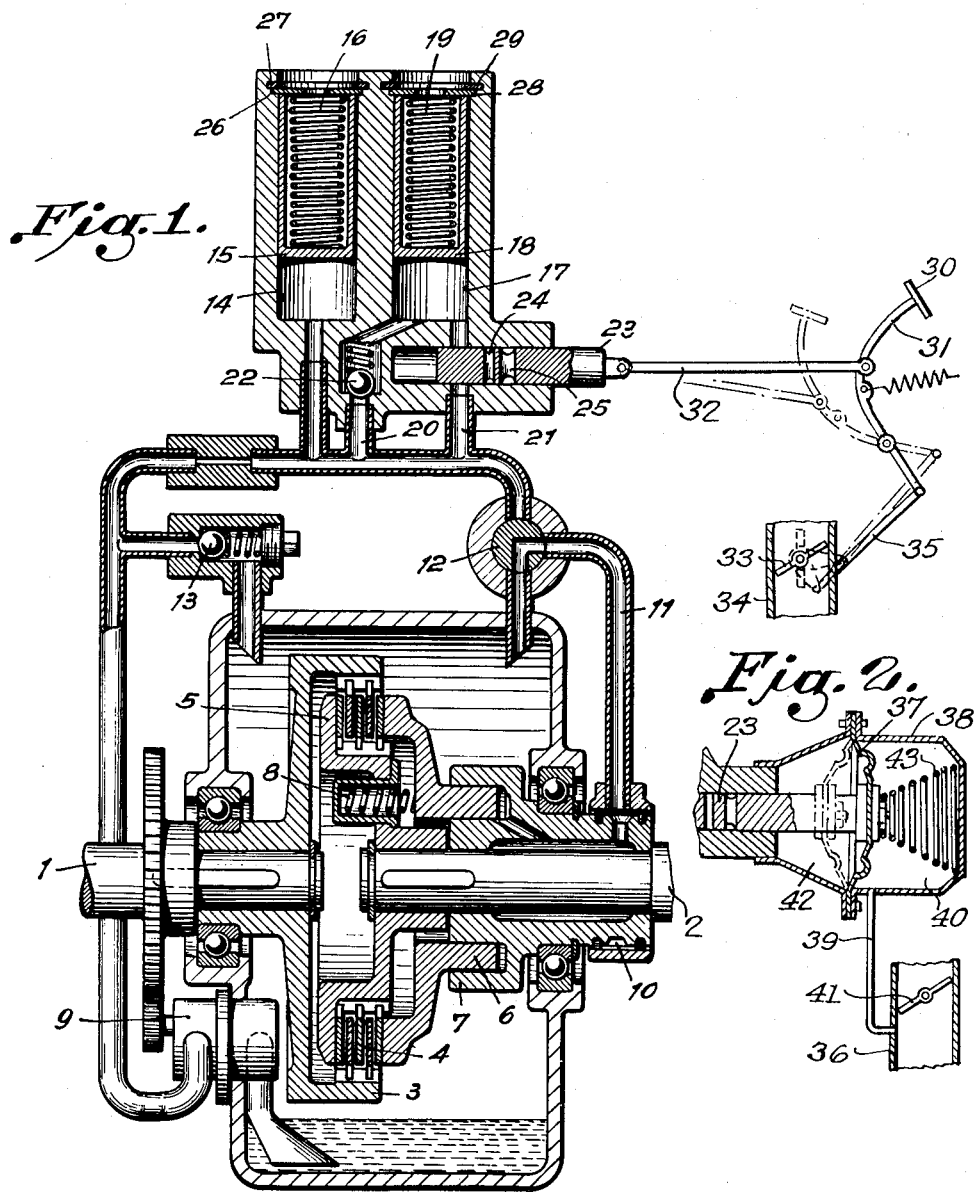

2,722,296

HYDRAULICALLY ACTUATED CLUTCH OR BRAKE

Wilhelm G. Stoeckicht, Munich-Solln, Germany

Application January 31, 1952, Serial No. 269,203

Claims priority, application Germany February 21, 1951

7 Claims. (Cl. 192—.075)

This invention relates to a hydraulically actuated clutch or brake and particularly to such clutches or brakes as preferably used in speed-change and reversing gear drives of automotive vehicles.

There are known speed-change and reversing gear drives in which speed change is achieved by applying braking to individual gear members or by coupling such members to one another, and in which the hydraulic means are maintained under a given maximum pressure by a pump driven from the driving shaft of the drive.

In the copending application Serial No. 213,234 filed February 28, 1951, I have proposed to interpose in the delivery line of the hydraulic system a storage cylinder and a piston therein displaceable against the action of a spring, whereby the characteristic and initial stress of the spring are so selected that it relaxes immediately after opening of the actuating means of a brake or clutch, upon displacement of the piston, to such an extent that the pressure, adjusting itself in the associated hydraulic power appliance, exerts the desired initial power for engaging the clutch or brake. A special arrangement provides that at the same time the storage cylinder is refilled within a time interval determined by the design, while simultaneously the pressure increases in the storage cylinder and the hydraulic system so that the rate of speed of engagement (gentle or hard) of clutch or brake can be adapted to suit prevailing requirements of operation.

In some cases it is advantageous and often necessary, especially in automotive transmission gearing and change gearing, to change the rate of speed of engagement (gentle of hard) of the shifting elements (brakes and clutches) during operation. Generally it is aimed at, to set the rate of speed of engagement in some relation to the torque of the engine and to control it in connection with the carburetor (fuel quantity control) or by means of the suction in the engine manifold.

For solving the problem at hand, the present invention provides the interposition of a plurality of displaceable pistons each one of which acting in its own cylinder and against the tension of its own spring. The characteristics and initial stresses of the springs being so selected that the springs in their end position and with filled cylinders are in equilibrium with the delivery pressure of the pump when clutch or brake are actuated, whereas the stresses exerted by the several springs upon the pistons are of various magnitude when the pistons are in their end positions in the emptied cylinders. According to this invention, one cylinder is hereby in direct connection with the pressure line, whereas the other cylinders are connected thereto through an inlet check valve opening only toward the cylinder, and through means for varying the cross-section of the line. In this manner it is possible to control the grade of hardness (gradually or forcefully) of engagement of the speed-change-effecting elements just as desired. Basically it is possible to interpose several cylinders controlled in this manner. Generally, however, it will suffice when only two cylinders are provided for this purpose, whereby one is in uncontrolled and the other in controlled connection with the pump. Often it will be advisable to effect the control in dependence of the torque of the driving engine, but it is not intended to limit the invention to such application.

It is preferable to adapt the spring in the cylinder, which is in uncontrolled connection with the delivery line of the pump, for soft or gradual engagement; and the spring in the second cylinder, which is in control connection with the delivery line of the pump, for hard or more forceful engagement.

The accompanying drawing shows, by way of example, a diagrammatic representation of one form of the present invention in connection with which a detailed description will now be given, from which further features of this invention will become apparent.

In the drawings:

Figure 1 is a diagrammatic longitudinal section through a clutch actuated and controlled by the means of the present invention, the control valve being shown as operating in dependence on the position of an accelerator pedal, other parts of the gearing being omitted; and Figure 2 is a fragmentary view of another form of actuating means for the control valve dependent upon intake manifold pressure.

It will be understood that the invention may as well be applied to a brake, such as, for instance, a jaw or band brake, but that on the other hand the invention is especially suitable for operation in connection with planetary gearing, because the ratio of such gear drives can be readily changed by engaging and disengaging friction clutches or brakes.

The friction clutch selected as an example is arranged between a driving shaft 1 and a driven shaft 2, and consists essentially of an outer clutch body 3 secured to the driving shaft, a bunch of laminations 4, and an inner clutch body 5 secured to the driven shaft. The bunch of laminations 4 can be brought into frictional engagement by means of a piston 6, which, in a pressure cylinder 7, can be supplied by a liquid under pressure, preferably oil. When the pressure liquid is shut off, the piston 6 is retracted from the bunch of laminations by the thrust of a series of springs 8.

The shaft 1 drives an oil pump 9, which delivers the oil necessary for the actuation of the clutch. Oil under pressure is supplied to the pressure cylinder 7 in a known manner by way of an annular groove, or channel 10, between packings. In a pipe 11 leading to this oil-supply groove 10 there is a switch 12, here shown as a cock, by which pressure oil is admitted to the pressure cylinder or shut off from it. Between the oil pump 9 and the cock 12 there are connected to the oil pipe an overload valve 13, which limits the pressure of the oil, and a storage cylinder 14, in which a piston 15, acting against the tension of spring 16, is pressed back by the oil against the annular stop 26 which is held in position, for example, by a spring ring 27 partly embedded in a groove in the cylinder wall. The stroke volume of storage cylinder 14 is substantially equal to the volume of the filling space of pressure cylinder 7. The spring 16 is in respect to characteristic and initial stress so selected that it is almost completely relaxed when the piston is in the position of an emptied cylinder. Additionally, there is provided a second storage cylinder 17, in which also a piston 18, acting against the tension of a spring 19, is pressed back by the oil pressure against an annular stop 28. The spring 19 is also seated on annular stop 28 which is held in position by spring ring 29 embedded in a corresponding annular groove in the inner piston wall. Characteristic and initial stress of spring 19 are so selected that its tension is in equilibrium with the oil pressure when cylinder 17 is filled, and that it looses very little tension when expanded in the piston end position with emptied cylinder. Cylinder 17 is in connection with pressure line 11 by way of two feed lines 20 and 21. In feed line 20 is a check valve 22 which prevents that the cylinder empties itself through this line. A control valve 23 in the form of a slide valve is inserted in line 21 by means of which this line can be opened or shut off. Control slide valve 23 is provided with several holes 24, 25 or slots etc., which serve the purpose of gradually increasing the outlet cross-section when control slide valve 23 is axially moved. Control slide valve 23 may be actuated from a point outside the clutch, and the valve may have connection for control in any known manner, such as, for example, with the carburetor control (fuel injection control), or may be actuated by the suction in the engine manifold.

Figure 1 illustrates a suitable arrangement for actuating control valve 23 in response to the movement of an accelerator pedal 30, the pedal lever 31 being connected to valve 23 by means of link 32 and having the usual connection to a throttle valve 33 of a carburetor 34 by means of a link 35. As shown in dot-dash lines of Figure 1, when the accelerator pedal is depressed to open throttle valve 33, control valve 23 will be moved to the left as seen in Figure 1, thereby opening line 21 to a degree dependent on the amount of movement of the accelerator pedal. Figure 2 illustrates an alternate type of actuating means for control valve 23 in which the valve movement is dependent upon the pressure in an intake passage 36 of a fuel supply system. In this arrangement the control valve is fixed to a flexible member 37 which is enclosed within a housing 38 connected to intake passage 36 by a line 39. Chamber 40 of housing 38 reflects the pressure in intake passage 36 as controlled by throttle valve 41, and is disposed on one side of flexible member 37, chamber 42 on the other side being vented. A spring 43 urges member 37 and valve 23 into valve opening position as shown in dot-dash lines in Figure 2. Upon opening of throttle valve 41 the pressure in passage 36 and in chamber 40 will rise, urging flexible member 37 and valve 33 toward the left as shown in Figure 2 and opening line 21 an amount dependent upon the pressure in passage 36.

The method of working of the arrangement may be described as follows. The driving shaft 1 drives the pressure-oil pump 9. Assuming first that the cock 12 is closed, that is to say, that it is shutting off the pipe leading to the pressure cylinder 7. It will be seen from the drawing that in the oil pipe 11 before valve 12 the oil is subject to the working pressure regulated by the excess-pressure valve 13. The oil pressure presses back the piston 15, in the storage cylinder 14, against the tension of spring 16, onto annular stop 26. If the inlet from the storage cylinder 14 to the pressure cylinder 7 of the clutch is now opened by the cock 12, the piston 6 therein presses the bunch of laminations 4 together against the action of springs 8. Since in the released condition there must be a certain distance between the individual friction surfaces of the laminations, the piston 6 must traverse a distance which corresponds to the sum of these distances before encountering a resistance. Thus the following takes place in the oil-pipe system: the spring 16, through the medium of the piston 15, forces the oil from the storage cylinder 14 into the clutch pressure cylinder 7; and since the stroke volumes of these two cylinders are approximately equal, the filling of the pressure cylinder 7 is effected practically without loss of time, and independently of the delivery quantity of the oil pump 9. During this operation the spring 16 relaxes down to the pressure that is necessary for the engaging movement of the piston 6. Therefore at the moment at which the friction clutch is brought into engagement, the application pressure upon the friction surfaces is quite small. From then onward, however, the oil pump 9 continues to deliver oil; and thus the storage cylinder is refilled, the piston 15 re-compressing the spring 16, until in the end position the normal working pressure in the pressure-oil system is again attained. This means that during the interval of time that is needed for the filling of the storage cylinder, the oil pressure, and therefore the application pressure of the clutch, gradually increase from approximately zero up to the full value. In this way an immediate closing of the clutch is obtained, the engaging operation being soft or gentle.

During the operation just described, control slide valve 23 remains in the position shown in the figure wherein it keeps line 21 closed. This is its position for soft or gentle clutch engagement. If control slide valve 23 is moved into its other end position, in which large hole 25 registers with line 21, actuation of the clutch is effected in a similar manner as described above, but with the difference that storage cylinder 17, in which substantially full oil pressure was maintained during the emptying cycle, empties now into the oil line with the consequent result that the actuated clutch or brake is subjected immediately to almost full pressure, giving rise to a quick or hard engagement.

If control slide valve 23 is moved into a medium position, in which, for example, only an opening of small cross-section (hole 24) registers with line 21, the choking effect of hole 24 will delay the filling of the hydraulic pressure system from both storage cylinders 14, 17 and a medium initial pressure will become effective. From the above it will be understood that by means of the system according to the present invention, the effective initial pressure for engagement of a clutch or brake can be controlled in a wide range and can be kept in proper relation to prevailing operating conditions, such as, for example, the torque exerted by the engine.

While I have shown and described in some detail a specific example of my invention, I am aware that changes can be made in construction of details and arrangement of parts, and I do not intend to be limited to the form shown, but desire to claim my invention as broadly as the appended claims and the prior art will permit.

I claim:

1. In a hydraulically actuated friction device, a source of fluid pressure, frictional means including a plurality of frictional elements adapted to move one against another, a chamber of variable size, the movable part of said chamber being operatively connected to said frictional means, a delivery line connecting said chamber with said source of fluid presure, control means in said delivery line and actuatable to open or close said line, opening of said line causing said frictional elements to be brought into engagement, resilient means for moving said frictional elements out of engagement, a plurality of cylinders, pistons movable within said cylinders, springs interposed between one side of each piston and its corresponding cylinder, cylinder chambers formed on the other sides of said pistons, the characteristics and initial stresses of said springs being such that said springs are both substantially in equilibrium with delivery pressure in said line when said cylinder chambers are filled, whereas said springs exert different forces when said cylinder chambers are emptied, a direct connection between one of said cylinders and said delivery line, a one-way valve between another of said cylinders and said delivery line opening toward said other cylinder, a passage leading from said other cylinder to said delivery line, means for varying the cross-section of said passage, and a safety valve connected to said delivery line for limiting the highest pressure produced by said source of fluid pressure.

2. The combination according to claim 1, further provided with stops for said pistons limiting each of said cylinders to a maximum size approximately equal to the size of said first chamber.

3. The combination according to claim 1, one of said frictional elements being adapted for connection to a driving engine, the means for controlling the cross-section of said passage including means for simultaneously controlling the torque of said driving engine.

4. The combination according to claim 1, the spring in that cylinder having a direct connection with said delivery line having a steep characteristic and such initial stress that it is substantially completely relaxed when its corresponding cylinder chamber is emptied.

5. The combination according to claim 1, the spring in that cylinder having a one-way valve connection with said delivery line having a flat characteristic and such initial stress that it loses almost none of its initial stress when its corresponding cylinder chamber is emptied.

6. The combination according to claim 1, one of said frictional elements being adapted for connection to a driving engine, the means for controlling the cross-section of said passage including means for simultaneously adjusting the fuel intake of said engine.

7. The combination according to claim 1, one of said frictional means being adapted for connection to a driving engine, the means for controlling the cross-section of said passage including an element movable in response to a change in the intake system pressure of said engine.

References Cited in the file of this patent

UNITED STATES PATENTS

| | | |
|---|---|---|
| 2,094,135 | Porter | Sept. 28, 1937 |
| 2,450,161 | Price | Sept. 28, 1948 |
| 2,459,363 | Chamberlain | Jan. 18, 1949 |

FOREIGN PATENTS

| | | |
|---|---|---|
| 474,539 | Great Britain | Nov. 3, 1937 |